(12) United States Patent
Niu et al.

(10) Patent No.: US 11,281,874 B2
(45) Date of Patent: Mar. 22, 2022

(54) FLEXIBLE TAG DEVICE AND FLEXIBLE SENSING SYSTEM COMPRISING THE SAME

(71) Applicants: Samsung Electronics Co., Ltd., Suwon-si (KR); THE BOARD OF TRUSTEES OF THE LELAND STANFORD JUNIOR UNIVERSITY, Stanford, CA (US)

(72) Inventors: Simiao Niu, Stanford, CA (US); Weichen Wang, Stanford, CA (US); Naoji Matsuhisa, Stanford, CA (US); Gae Hwang Lee, Seongnam-si (KR); Zhenan Bao, Stanford, CA (US)

(73) Assignees: The Board of Trustees of the Leland Stanford Junior University, Stanford, CA (US); Samsung Electronics Co., Ltd., Gyeonggi-do (KR)

( * ) Notice: Subject to any disclaimer, the term of this patent is extended or adjusted under 35 U.S.C. 154(b) by 98 days.

(21) Appl. No.: 16/898,809

(22) Filed: Jun. 11, 2020

(65) Prior Publication Data

US 2021/0390273 A1    Dec. 16, 2021

(51) Int. Cl.
*G06K 7/08* (2006.01)
*G06K 7/10* (2006.01)
*G06K 19/077* (2006.01)

(52) U.S. Cl.
CPC ... *G06K 7/10316* (2013.01); *G06K 19/07773* (2013.01)

(58) Field of Classification Search
CPC ........... G06K 7/10366; G06K 19/0717; G06K 19/0723; G06F 1/163; A61B 5/0022

USPC ........................................ 235/451, 449, 493
See application file for complete search history.

(56) References Cited

U.S. PATENT DOCUMENTS

| 8,933,789 | B1* | 1/2015 | Fink .................. G06K 19/07762 340/10.1 |
|---|---|---|---|
| 9,636,045 | B2* | 5/2017 | Fleischer .............. A61B 5/1038 |
| 9,786,148 | B2 | 10/2017 | Sundaram et al. |
| 10,292,642 | B2 | 5/2019 | Euliano et al. |
| 10,635,868 | B1 | 4/2020 | Yun et al. |
| 10,709,945 | B2* | 7/2020 | Hunter ............... G06K 7/10009 |
| 2004/0178955 | A1* | 9/2004 | Menache ................ A63F 13/06 342/463 |

(Continued)

FOREIGN PATENT DOCUMENTS

EP          3386388 A1    10/2018
WO    WO-2017127157 A1    7/2017

*Primary Examiner* — Daniel St Cyr
(74) *Attorney, Agent, or Firm* — Harness, Dickey & Pierce, P.L.C.

(57) ABSTRACT

A flexible sensing system includes: a flexible tag device including a first antenna, first sensor and second sensors, first modulation transistor and second modulation transistors connected to both ends of the first antenna, first ring oscillator that drives the first modulation transistor together with the first sensor, and a second ring oscillator that drives the second modulation transistor together with the second sensor; and a reader device that is flexible and includes a second antenna that is inductively coupled with the first antenna, extracts an output signal of the tag device for each frequency bandwidth, and corrects an output signal change of the tag device according to a coupling change between the first antenna and the second antenna.

20 Claims, 15 Drawing Sheets

(56) References Cited

U.S. PATENT DOCUMENTS

| | | | |
|---|---|---|---|
| 2007/0075148 A1* | 4/2007 | Usami | G06K 19/0716 235/492 |
| 2009/0095818 A1* | 4/2009 | Smith | G06K 19/07749 235/492 |
| 2015/0346039 A1* | 12/2015 | Ito | H01Q 1/2225 374/117 |
| 2018/0014747 A1 | 1/2018 | Akselrod | |
| 2018/0117446 A1* | 5/2018 | Tran | A42B 3/0433 |
| 2018/0153450 A1* | 6/2018 | Routh | A61B 5/6861 |
| 2019/0029566 A1 | 1/2019 | Sundaram et al. | |

\* cited by examiner

FLEXIBLE TAG DEVICE AND FLEXIBLE SENSING SYSTEM COMPRISING THE SAME

BACKGROUND

(a) Technical Field

Example embodiments relate to a flexible tag device and/or a flexible sensing system including the same.

(b) Description of the Related Art

When a tag formed only of an antenna and a sensor transmits a sensor signal to a reader, the tag transmits a signal that is proportional to a sensor measurement value. In this case, when coupling is changed due to a change in a distance or angle between a tag antenna and a reader antenna, the signal transmission efficiency is changed and the signal is changed. That is, it is difficult to distinguish whether the signal measured by the reader is due to a sensor measurement value or a tag-reader coupling change.

Thus, sensor measurement values can only be trusted when the tag and reader are in the correct position. In a wearable device, when the body has a high frequency of movement, an accurate sensor value cannot be measured.

The above information disclosed in this Background section is only for enhancement of understanding of the background and therefore it may contain information that does not form the prior art that is already known in this country to a person of ordinary skill in the art.

SUMMARY

A flexible tag device that can accurately measure a sensor value measured by a sensor without an influence of coupling between antennas, and a flexible sensing system including the same, can be provided.

A flexible sensing system according to an example embodiment includes: a flexible tag device and a reading device. The flexible tag device includes a first antenna, a first sensor and a second sensor, a first modulation transistor and a second modulation transistor connected to ends of the first antenna, a first ring oscillator configured to drive the first modulation transistor together with the first sensor, and a second ring oscillator configured to drive the second modulation transistor together with the second sensor. The reader device is flexible, and the reading device includes a second antenna inductively coupled with the first antenna, the reader device configured to extract an output signal of the flexible tag device for each frequency bandwidth, and to correct a change in the output signal of the flexible tag device based on a coupling change between the first antenna and the second antenna.

In some example embodiments, the flexible tag device further includes a reference frequency transistor connected between the ends of the first antenna; and a reference frequency oscillator configured to drive the reference frequency transistor, wherein the reader device includes processing circuitry configured to correct the change in the output signal of the first antenna based on a reference frequency signal according to load modulation of the reference frequency transistor.

In some example embodiments, the processing circuitry of the reader device is configured to, extract the reference frequency signal for each frequency bandwidth from the output signal of the flexible tag device, extract a first sensor signal according to load modulation of the first modulation transistor, extract a second sensor signal according load modulation of the second modulation transistor, and correct a frequency of each of the first sensor signal and the second sensor signal based on a change in a frequency of the reference frequency signal.

In some example embodiments, the processing circuitry of the reader device is configured to, detect a frequency difference between a transmitted version of the reference frequency signal transmitted from the flexible tag device and a received version of the reference frequency signal received at the reader device, and correct both the frequency of the first sensor signal and the frequency of the second sensor signal based on the frequency difference.

In some example embodiments, the processing circuitry of the reader device is configured to, extract the reference frequency signal for each frequency bandwidth from the output signal of the flexible tag device, extract a first sensor signal according to load modulation of the first modulation transistor, extract a second sensor signal according to load modulation of the second modulation transistor, and correct strength of each of the first sensor signal and the second sensor signal based on a change in strength of the reference frequency signal.

In some example embodiments, the processing circuitry of the reader device is configured to, detect a strength difference between a transmitted version of the reference frequency signal transmitted from the flexible tag device and a received version of the reference frequency signal received at the reader device, and correct the strength of the first sensor signal and the strength of the second sensor signal based on the strength difference.

In some example embodiments, the processing circuitry of the reader device is configured to, measure a DC component change of the output signal of the flexible tag device, extract a first sensor signal and a second sensor signal for each frequency bandwidth from the output signal of the flexible tag device, and correct the first sensor signal and the second sensor signal based on the DC component change.

In some example embodiments, the processing circuitry of the reader device includes a reader circuit configured to, detect a DC component of a signal input through the second antenna, estimate an amount of change in frequency according to a DC component difference between the DC component and a reference DC component, and correct a frequency of each of the first sensor signal and the second sensor signal by the amount of change in the frequency.

In some example embodiments, the processing circuitry of the reader device includes a reader circuit configured to, detect a DC component of a signal input through the second antenna, estimate an amount of change in frequency according to a DC component difference between the DC component and a reference DC component, and correct strength of each of the first sensor signal and the second sensor signal based on the amount of change in the frequency.

In some example embodiments, the first sensor is connected between feedback loops between an input and an output of the first ring oscillator, and the second sensor is connected between feedback loops between an input and an output of the second ring oscillator.

In some example embodiments, the flexible tag device further includes a reference frequency transistor connected between the ends of the first antenna; and a reference frequency oscillator configured to drive the reference frequency transistor, the reference frequency oscillator including a ring oscillator and a resistor having constant resistance, the resistor connected to a feedback loop between an input end and an output end of the ring oscillator.

In some example embodiments, the first sensor is coupled in series with the first modulation transistor, and the second sensor is coupled in series with the second modulation transistor.

In some example embodiments, the flexible tag device further includes a reference frequency transistor; a reference frequency oscillator configured to drive the reference frequency transistor; and a resistor having constant resistance, the resistor coupled in series with the reference frequency transistor between the ends of the first antenna.

In some example embodiments, the flexible sensing system further includes a rectifier circuit configured to, rectify an AC input transmitted from the first antenna and to generate a first driving voltage and a second driving voltage, wherein the first driving voltage and the second driving voltage are supplied to the first ring oscillator and the second ring oscillator, respectively.

In some example embodiments, the rectifier circuit includes a first diode including an anode connected to the first antenna, the first diode configured to rectify a current flowing to a ground from one end of the first antenna; a second diode including an anode connected to the ground, the second diode configured to rectify a current flowing to the one end of the first antenna from the ground; a first capacitor connected between a cathode of the first diode and the ground, the first capacitor configured to receive the first driving voltage; and a second capacitor connected between the ground and the anode of the second diode, the second capacitor configured to receive the second driving voltage.

In some example embodiments, the rectifier circuit includes a first diode including an anode connected to one end of the first antenna and a cathode connected to a first node, the first node configured to receive the first driving voltage; a second diode including an anode connected to a second node and a cathode connected to the one end of the first antenna, the second node configured to receive the second driving voltage; a third diode including an anode connected to a ground and a cathode connected to the first node; a fourth diode including an anode connected to the second node and a cathode connected to the ground; and a capacitor connected between the first node and the second node.

Some example embodiments relate to a flexible tag device that is inductively coupled with a reader device.

In some example embodiments, the flexible tag device includes a first antenna; a first sensor and a second sensor; a first modulation transistor and a second modulation transistor connected between ends of the first antenna; a reference frequency transistor connected between the ends of the first antenna; a first ring oscillator configured to drive the first modulation transistor together with the first sensor; a second ring oscillator configured to drive the second modulation transistor together with the second sensor; and a reference frequency oscillator configured to drive the reference frequency transistor, wherein a change in an output signal of the flexible tag device, due to a coupling change between the first antenna and a second antenna of the reader device, is corrected based on a reference frequency signal generated by driving of the reference frequency transistor.

In some example embodiments, the first sensor is connected between a feedback loop between an input end and an output end of the first ring oscillator, the second sensor is connected between a feedback loop between an input end and an output end of the second ring oscillator, a first sensor signal and a second sensor signal are extracted for each frequency bandwidth from the output signal of the flexible tag device, and a frequency of the first sensor signal and the second sensor signal are corrected based on a change in frequency of the reference frequency signal.

In some example embodiments, the first sensor is coupled in series with the first modulation transistor and the second sensor is coupled in series with the second modulation transistor, a first sensor signal and a second sensor signal are extracted for each frequency bandwidth from the output signal of the flexible tag device, and strengths of the first sensor signal and the second sensor signal are corrected based on a change in strength of the reference frequency signal.

In some example embodiments, the first antenna, the first and second modulation transistor, the first ring oscillator, the second ring oscillator, the first sensor, the second sensor, the reference frequency transistor, and the reference frequency oscillator are flexible.

DETAILED DESCRIPTION

Figure 1:
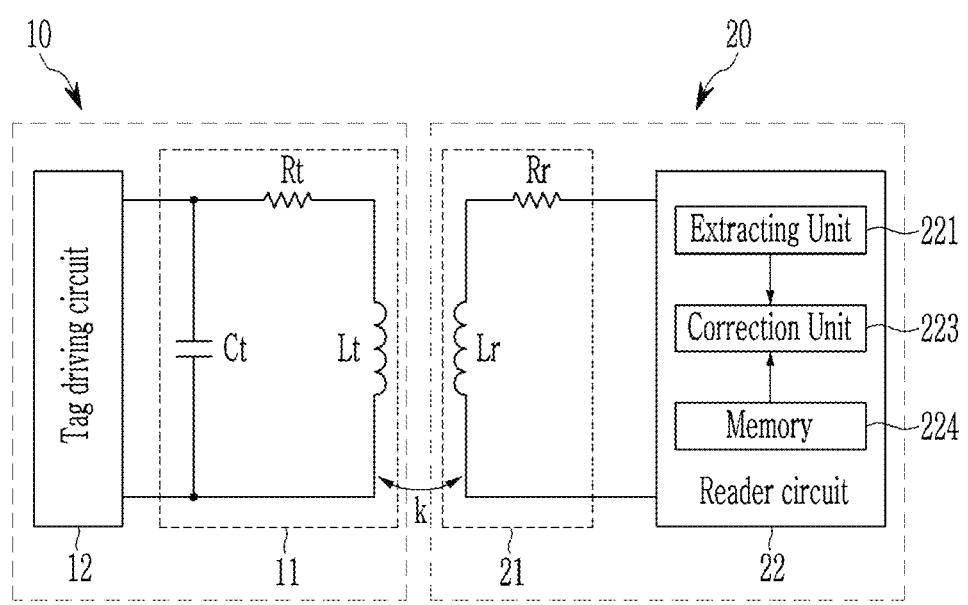
FIG. 1 shows a flexible sensing system according to an example embodiment.

Hereinafter, example embodiments disclosed in the present specification will be described in detail with reference to the accompanying drawings. In the present specification, the same or similar components will be denoted by the same or similar reference numerals, and an overlapped description thereof will be omitted. Terms "module" and "unit" for components used in the following description are used only in order to easily make a specification. Therefore, these terms do not have meanings or roles that distinguish them from each other in themselves. Further, in describing example embodiments of the present specification, when it is determined that a detailed description of the well-known art may obscure the gist of example embodiments, it will be omitted. In addition, the accompanying drawings are provided only in order to allow example embodiments disclosed in the present specification to be easily understood and are not to be interpreted as limiting the spirit disclosed in the present specification, and it is to be understood that the example embodiments include all modifications, equivalents, and substitutions without departing from the scope and spirit of the example embodiments.

Terms such as first, second, and the like may be used to describe various components, and the components should not be limited by the terms. The terms are used only to discriminate one component from another component.

It should be understood that, when it is described that a component is "connected to" or "accesses" another component, the component may be directly connected to or accesses the other component or a third component may be present therebetween. In contrast, it should be understood that, when it is described that a component is "directly connected to" or "directly accesses" another component, it is understood that no element is present therebetween.

A singular form may include a plural form if there is no clearly opposite meaning in the context.

In the present application, it should be understood that the term "include" or "have" indicates that a feature, a number, a step, an operation, a component, a part, or a combination thereof described in the specification is present, but does not exclude the possibility of presence or addition of one or more other features, numbers, steps, operations, components, parts, or combinations thereof, in advance.

Hereinafter, example embodiments will be described with reference to the accompanying drawings.

FIG. 1 shows a flexible sensing system according to an example embodiment.

A flexible sensing system 1 includes a flexible tag device 10 and a flexible reader device 20. Hereinafter, in all of the example embodiments related to the tag device 10 and the reader device 20, they are formed of flexible elements. A circuit and a sensor that form the tag device 10 and the reader device 20 can be implemented by using a poly-based flexible semiconductor material and a flexible electrode material.

The tag device 10 and the reader device 20 may be inductively coupled at a predetermined resonance frequency. The tag device 10 and the reader device 20 may communicate with each other using wireless communication such as NFC or RFID.

The reader device 20 supplies driving power to the tag device 10 through a wireless power signal in a non-contact manner, receives an output signal from the tag device 10, and extracts a sensor signal by frequency bandwidth by examining a frequency component of the received output signal. The reader device 20 corrects a signal change according to the coupling change between antennas 11 and 21 for the extracted sensor signal for each band, and reads the corrected sensor signal.

At least one of the frequency and strength of the sensor signal may be changed by the coupling change. The reader device 20 may perform a correction operation that attenuates the sensor signal for each band extracted by at least one variance of the frequency and strength generated by the coupling change.

Specifically, the reader device 20 includes the antenna 21 and a reader circuit 22. The antenna 21 is an equivalent circuit, and can be expressed as a flexible inductor Lr and a resistor Rr connected in series with each other.

The reader circuit 22 extracts the frequency components of the sensor signal received through the antenna 21 by frequency bandwidth, performs a corresponding one of frequency correction and amplitude correction for each extracted band sensor signal, and reads a corrected sensor signal. The reader circuit 22 comprises an extracting unit 221, a correction unit 222, and a memory 223.

There are three parameters, i.e., a resonant frequency f, a quality factor Q, and a coupling coefficient k, that exist between the tag device 10 and the reader device 20, and the resonance frequency f and the quality factor Q can be represented as shown in Equation 1.

[Equation 1]

$$Q = \frac{2\pi f L_{tag}}{R_{tag}}, f = \frac{1}{2\pi\sqrt{L_{tag}C_{tag}}}$$

Here, Ltag, Ctag, and Rtag respectively denote inductance of the inductor Lt of the antennal 11, capacitance of the capacitor Ct, and resistance of the resistor Rt.

The tag device 10 may be implemented as a passive flexible tag that measures several biosignals and transmits a signal through one antenna. The tag device 10 may transmit a signal to the reader device 20 using one frequency bandwidth or one frequency for one sensor signal. The tag device 10 includes the antenna 11 and a tag driving circuit 12, the tag driving circuit 12 includes at least two sensors, and a sensor signal is generated by each sensor.

When the tag device 10 uses one frequency bandwidth with respect to each sensor signal, sensor 1 (e.g., a temperature sensor) changes the frequency of the sensor signal within a predetermined range according to the temperature change in a range of 20 degrees to 50 degrees, and sensor 2 (e.g., a humidity sensor) changes the frequency of the sensor signal within a predetermined range according to a humidity change in the 0% RH to 100% RH range. The tag device 10 may mix the frequency signal from the sensor 1 and the frequency signal from the sensor 2 and transmit the mixed signal to the reader device 20 through the antenna 11.

In a conventional tag, a sensor value modulates the size of the antenna signal. However, in the tag device 10 according to the example embodiment, the sensor value modulates the frequency. In principle, the sensor signal transmitted to the reader device 20 does not depend on the coupling between the antenna of the tag device 10 and the antenna of the reader device 20. However, when the coupling between the antenna of the tag device 10 and the antenna of the reader device 20 actually changes, the energy received from the reader device 20 by the tag device 10 is reduced. Then, the DC voltage rectified by the diode of the tag device 10 is changed, and the frequency or strength of the oscillator signal generated by a stretching ring oscillator is changed due to the changed DC voltage.

The flexible sensing system 1 according to the example embodiment may correct a coupling change between antennas 11 and 21. To correct the coupling change, the reader device 20 can directly measure the change in the DC component of the output signal of the tag device 10. Alternatively, the tag device 10 may generate a reference frequency signal reflecting the change of the DC voltage according to the coupling change to correct the coupling change, and the reader device 20 may use the frequency change or the strength change of the reference frequency signal.

First, an example embodiment in which the tag device 10 generates a reference frequency signal in order to correct a DC voltage change due to coupling between antennas will be described.

Figure 2:
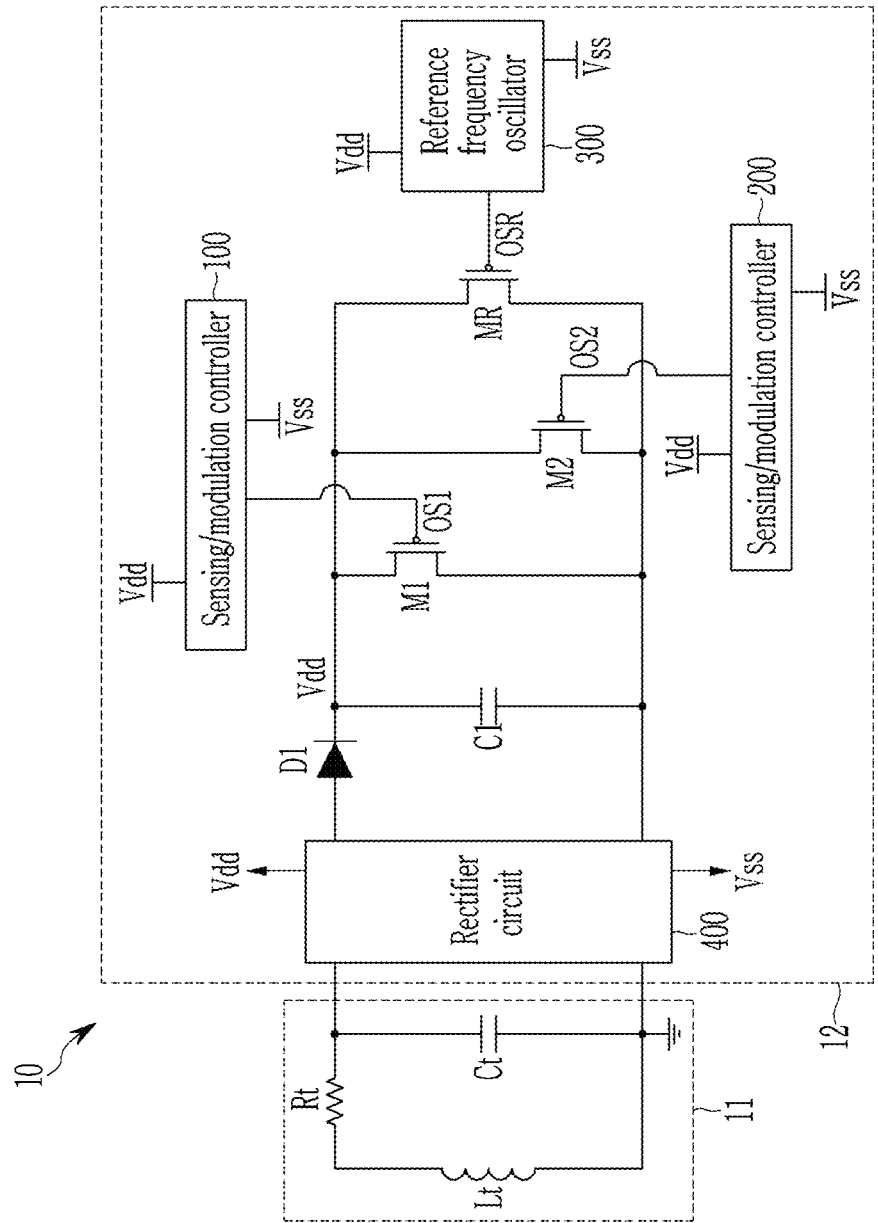
FIG. 2 shows the tag device according to the example embodiment.

FIG. 2 shows the tag device according to the example embodiment.

The tag device 10 includes the antenna 11 and the tag driving circuit 12, and the tag driving circuit 12 includes two modulation transistors M1 and M2, a reference frequency transistor MR, two sensing/modulation control units 100 and 200, a reference frequency oscillator 300, a rectifier circuit 400, a rectifier diode D1, and a capacitor C1.

The rectifier circuit 400 rectifies an AC input that is input from the antenna 11 to generate a driving voltage Vdd and a driving voltage Vss. The AC input that is input from the antenna 11 through the rectifying diode D3 and the capacitor C1 is rectified to generate a driving voltage Vdd, and the driving voltage Vdd is supplied to the modulation transistors M1 and M2 and a source of the reference transistor MR. The driving voltage Vdd may be maintained by the storage capacitor C1. The driving voltage Vss of the rectifier circuit 400 may be a voltage required for the operation of the ring oscillator.

In FIG. 2, two modulation transistors and two sensing/modulation controllers are included, but example embodiments are not limited thereto. The number of modulation transistors and ring oscillators may be determined according to the number of sensors provided in the tag device, and two or more sensors may be provided in the tag device.

In order to correct the coupling between the antenna 21 of the reader device 20 and the antenna 11 of the tag device 10, the tag device 10 of the embodiment shown in FIG. 2 includes the reference frequency transistor MR and a reference frequency oscillator 300 that generate a reference frequency signal.

Figure 3:
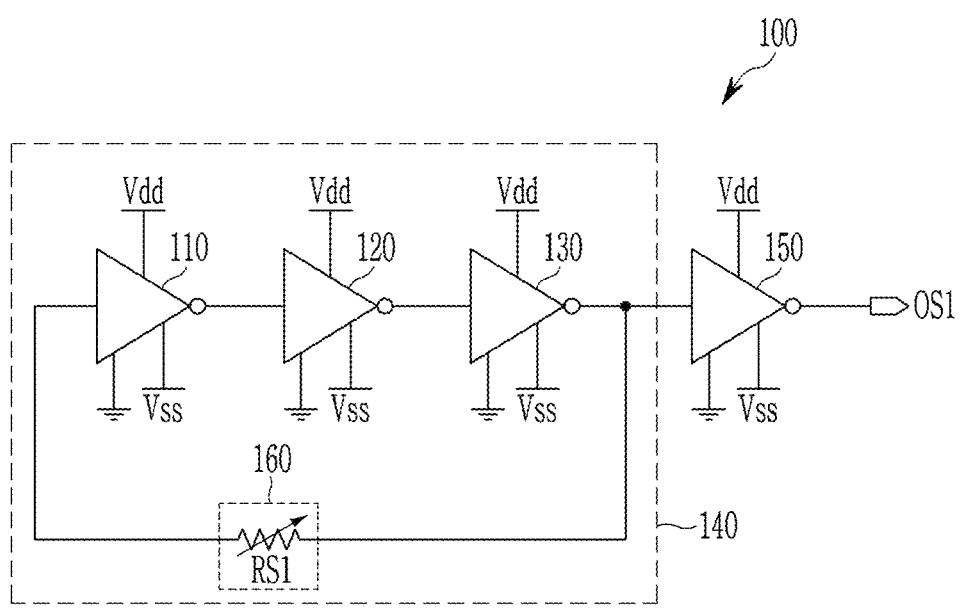
FIG. 3 and FIG. 4 show two sensing/modulation controllers according to the example embodiment.
Figure 4:
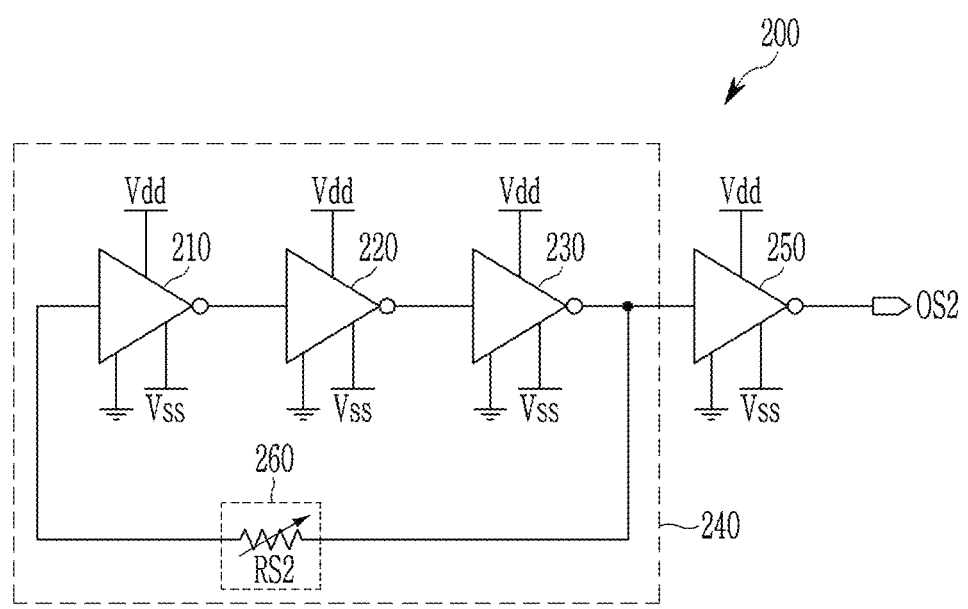

FIG. 3 and FIG. 4 show two sensing/modulation controllers according to the example embodiment.

Sensing/modulation controllers 100 and 200 include ring oscillators 140 and 240, sensors 160 and 260 that are connected between feedback loops between inputs and outputs of the ring oscillators 140 and 240, and output buffers 150 and 250.

Each of the ring oscillators 140 and 240 is designed such that the frequency bands generated by the corresponding sensors 160 and 260 do not overlap with the frequency bands generated by other sensors. The sensors 160 and 260 may include variable resistors RS1 and RS2 whose resistance values change according to sensing. For example, the resistances of the variable resistors RS1 and RS2 may change according to sensing strength.

In FIG. 3 and FIG. 4, each of the ring oscillators 140 and 240 is formed of three inverters 110 to 130 and 210 to 230, but the example embodiments are not limited thereto. The number of inverters may be set to control a frequency bandwidth generated from each of the sensors 160 and 260.

Outputs of the inverters 110 and 210 are input to the inverters 120 and 220, outputs of the inverters 120 and 220 are input to the inverters 130 and 230, and outputs of the inverters 130 and 230 are input to the inverters 110 and 210. At this time, the sensors 160 and 260 are connected between the outputs of the inverters 130 and 230 and the inputs of the inverters 110 and 210.

The variable resistors RS1 and RS2 of the sensors 160 and 260 are connected in series between the outputs of the inverters 130 and 230 and the outputs of the inverters 110 and 210. The output buffers 150 and 250 may be implemented as inverters, and receive outputs of the ring oscillators 140 and 240 to generate oscillator signals OS1 and OS2. When the sensor 160 or 260 detects a change in the sensing target, the resistance values of the variable resistors RS1 and RS2 are changed to modulate the output frequencies of the ring oscillators 140 and 240, thereby causing the frequencies of the oscillator signals OS1 and OS2 to be modulated.

Figure 5:
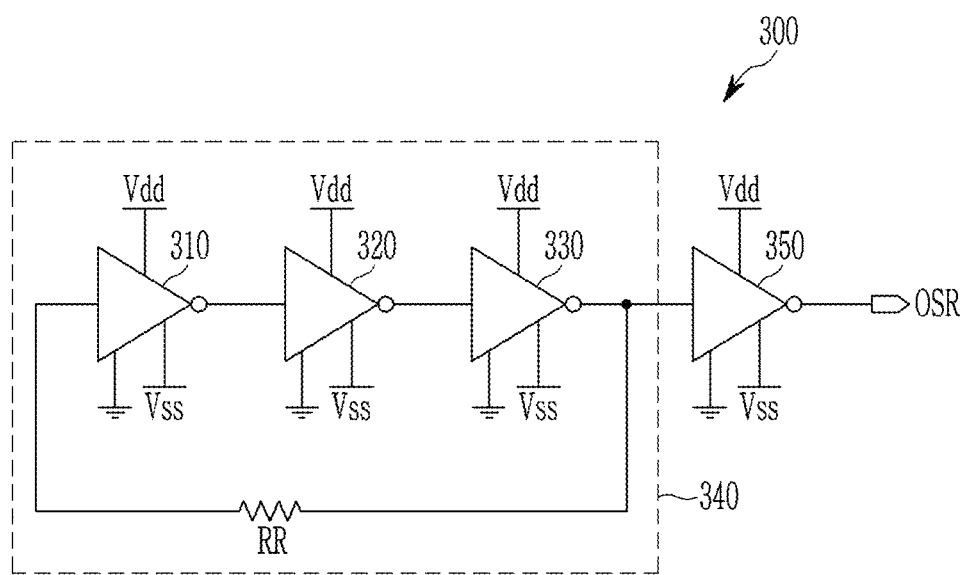
FIG. 5 shows the reference frequency oscillator according to the example embodiment.

FIG. 5 shows the reference frequency oscillator according to the example embodiment.

The reference frequency oscillator 300 includes a ring oscillator 340 formed of three inverters 310 to 330, and an output buffer 350.

An output of the inverter 310 is input to the inverter 320, an output of the inverter 320 is input to the inverter 330, and an output of the inverter 330 is input to the inverter 310. In this case, a reference resistor RR is connected between the output of the inverter 330 and the input of the inverter 310. The reference resistor RR is connected in series between the output of the inverter 330 and the input of the inverter 310. The output buffer 350 may be implemented as an inverter, and receives the output of the ring oscillator 340 to generate a reference oscillator signal OSR.

The inverters 110 to 130, 210 to 230, and 310 to 330 and the output buffers 150, 250, and 350 are each supplied with driving voltages Vdd and Vss from the rectifier circuit 400 and are connected to ground. The inverters 110 to 130, 210 to 230, and 310 to 330 and the output buffers 150, 250, 350 output ground level voltages in response to inputs corresponding to logic level 1, and inputs corresponding to logic level 0. In response, the voltage of the driving voltage Vdd level may be output. The driving voltage Vss is a voltage for controlling an output according to an input corresponding to logic level 1 and may be lower than the ground voltage. The driving voltage Vdd may be higher than the ground voltage.

The oscillator signal OS1 is input to a gate of the modulation transistor M1, and the modulation transistor M1 switches according to the oscillator signal OS1 to generate a first modulation signal. The oscillator signal OS2 is input to a gate of the modulation transistor M2, and the modulation transistor M2 switches according to the oscillator signal OS2 to generate a second modulated signal. The reference oscillator signal OSR is input to a gate of the reference transistor MR, and the reference transistor MR switches according to the reference oscillator signal OSR to generate a reference modulation signal.

The antenna 11 is driven according to the first modulated signal, the second modulated signal, and the reference modulated signal to generate a first sensor signal, a second sensor signal, and a reference frequency signal for each corresponding frequency band. An output signal of the tag device 10 in which the generated signals are combined is transmitted to the reader device 20.

Figure 6:
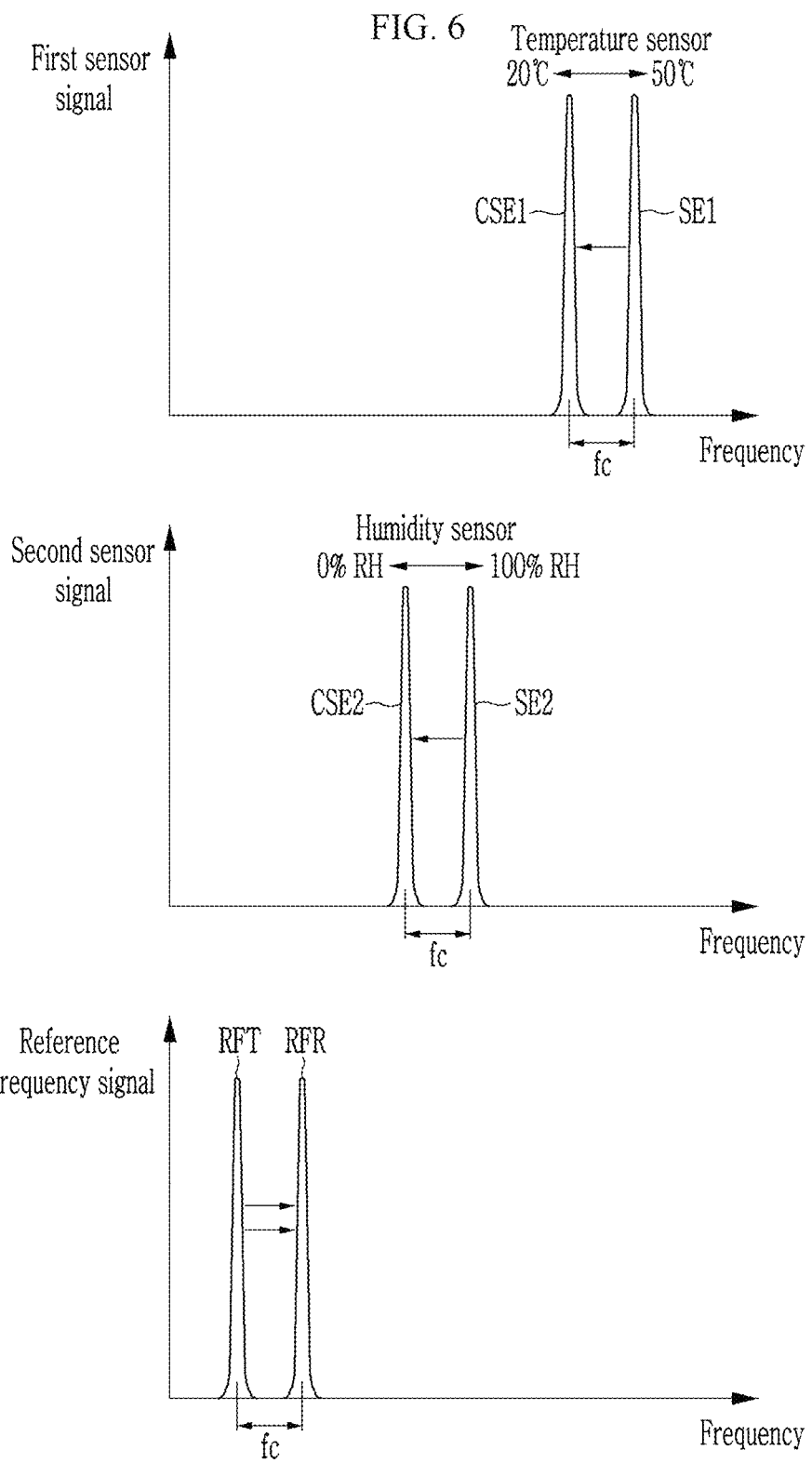
FIG. 6 is a waveform diagram that shows extraction of the output signal of the tag device, received by the reader device for each frequency bandwidth, and correction with respect to the extracted signals.

FIG. 6 is a waveform diagram that shows extraction of the output signal of the tag device, received by the reader device for each frequency bandwidth, and correction with respect to the extracted signals.

As shown in FIG. 6, a reference frequency signal RFT transmitted from the tag device 10 and a reference frequency signal FRF received at the reader device 20 have different frequencies due to coupling between the antennas 11 and 21. The reader circuit 22 stores information on the frequency of the reference frequency signal RFT transmitted from the tag device 10, and detects a difference fc between the frequency of the reference frequency signal RFR extracted by the extracting unit 221 and the frequency of the reference frequency signal RFT. The memory 223 stores the information on the frequency of the reference frequency signal RFT.

The first sensor signal SE1 indicates a result detected in a temperature range of 20 degrees to 50 degrees by a temperature sensor (e.g., the sensor 160), and the second sensor signal SE2 indicates a result detected in a humidity range of 0% RH to 100% RH by a humidity sensor (e.g., the sensor 260).

The correction unit 222 of the reader circuit 22 generates a first compensation sensor signal CSE1 by correcting the frequency of the extracted first sensor signal SE1 by the frequency difference fc, and generates a second compensation sensor signal CSE2, which is corrected by the frequency difference fc from the frequency of the extracted second sensor signal SE2.

In FIG. 6, the frequency of the reference frequency signal is increased as much as the frequency difference fc, and the first compensation sensor signal CSE1 and the second compensation sensor signal CSE2 are generated by reducing the frequency of each of the first sensor signal SE1 and the second sensor signal SE2 by the frequency difference fc.

Figure 7:
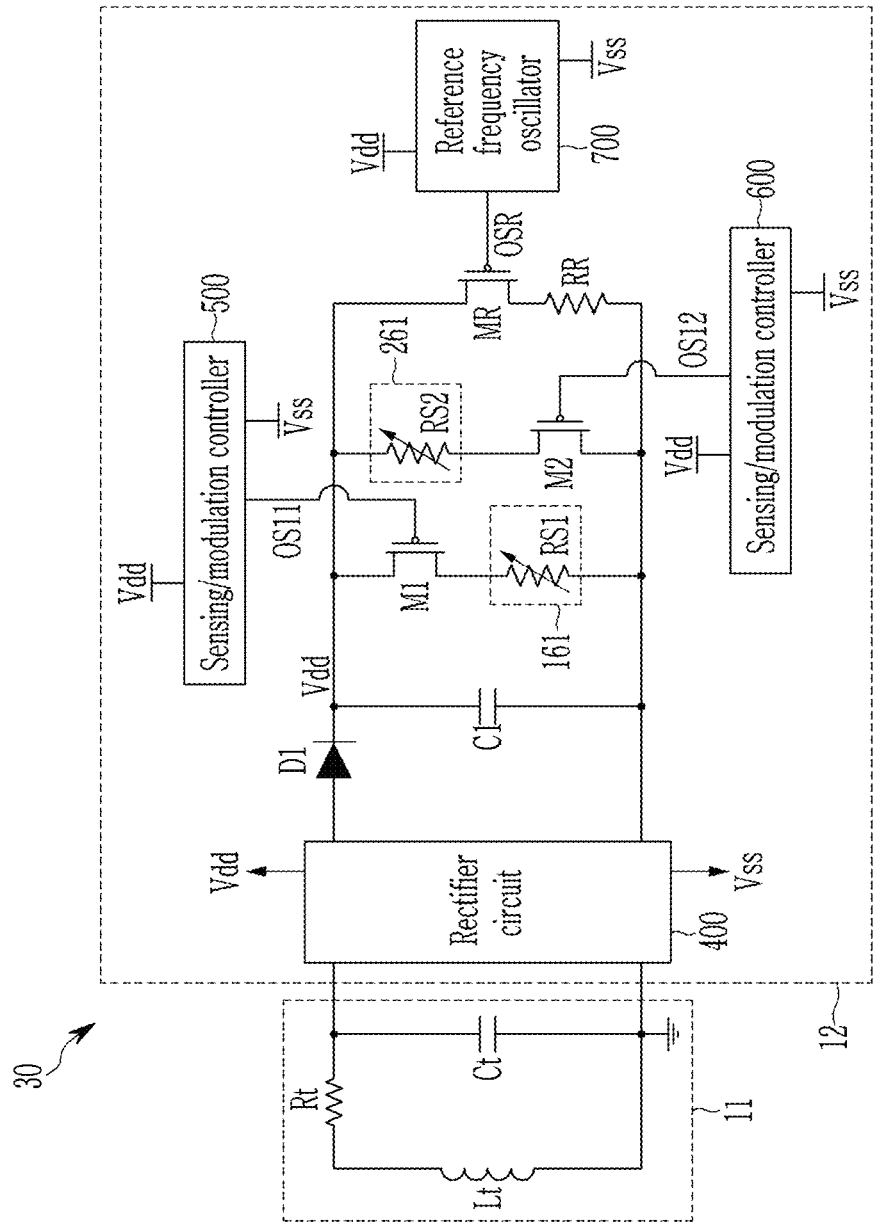
FIG. 7 shows a tag device according to an example embodiment.

FIG. 7 shows a tag device according to an example embodiment.

As shown in FIG. 7, compared to the tag device 10 of the example embodiment shown in FIG. 2, in a tag device 30, sensors 161 and 261 are combined with modulation transistors M1 and M2 rather than being combined with a modulation controller, and a reference resistor RR is combined to a reference transistor MR rather than being combined to a reference frequency oscillator.

The sensor 161 includes a variable resistor RS1, and the variable resistor RS1 is connected in series between a driving voltage Vdd and the ground together with the modulation transistor M1. The sensor 261 includes a variable resistor RS2, and the variable resistor RS2 is connected in series between the driving voltage Vdd and ground together with the modulation transistor M2. The reference transistor MR is connected in series between the driving voltage Vdd and the ground together with the reference resistor RR.

Figure 8:
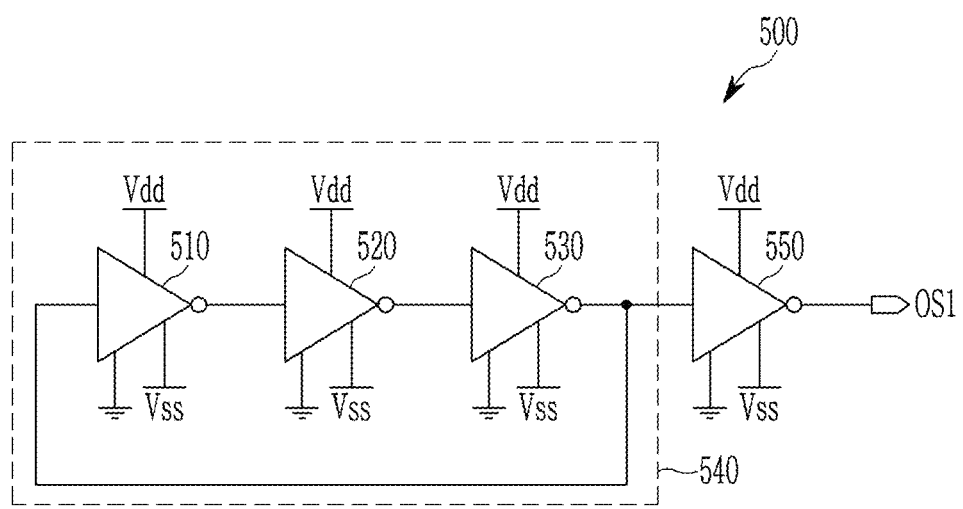
FIG. 8 and FIG. 9 show the two modulation controllers shown in FIG. 7.
Figure 9:
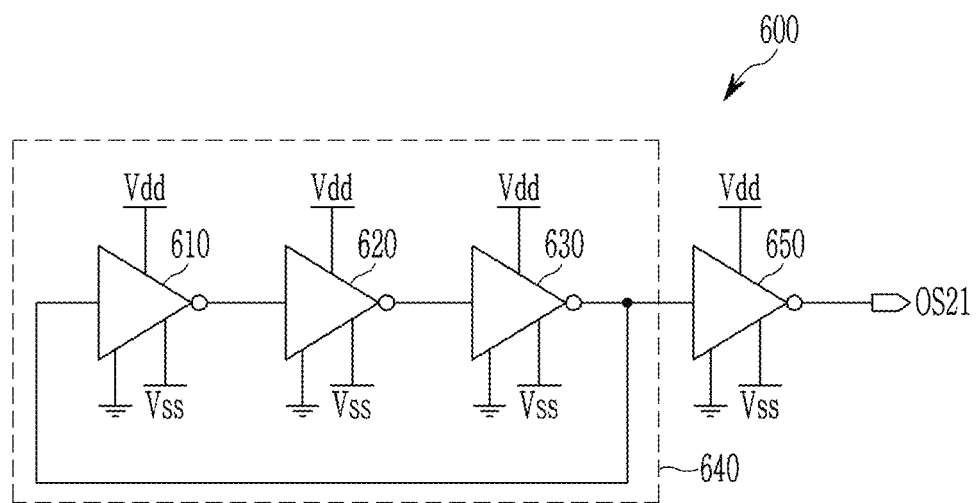

FIG. 8 and FIG. 9 show the two modulation controllers shown in FIG. 7.

The modulation controllers 500 and 600 include ring oscillators 540 and 640 and output buffers 550 and 650.

The modulation controller 500 shown in FIG. 8 is the same as the sensing/modulation controller 100 shown in FIG. 3 in configuration, except for the sensor 160. The modulation controller 600 shown in FIG. 9 is the same the sensing/modulation controller 200 shown in FIG. 4 in configuration, except for the sensor 260.

Each of the ring oscillators 540 and 640 is designed such that the frequency bands generated by the corresponding sensors 161 and 261 do not overlap with the frequency bands generated by the other sensors.

In FIG. 8 and FIG. 9, the ring oscillators 540 and 640 are also implemented by three inverters 510 to 530 and 610 to 630, but example embodiments are not limited thereto, and the number of inverters may be set to control a frequency bandwidth generated from each of the sensors 161 and 261.

Outputs of the inverters 510 and 610 are input to the inverters 520 and 620, outputs of the inverters 520 and 620 are input to the inverters 530 and 630, and outputs of the inverters 530 and 630 are input to the inverters 510 and 610.

The output buffers 550 and 650 may be implemented as inverters, and receive outputs of the ring oscillators 540 and 640 to generate oscillator signals OS11 and OS12. When the sensor 161 or 261 detects a change in the sensing target, resistance values of variable resistors RS1 and RS2 are changed to modulate the strength of the modulation signal generated by the switching of each of the modulation transistors M1 and M2.

Figure 10:
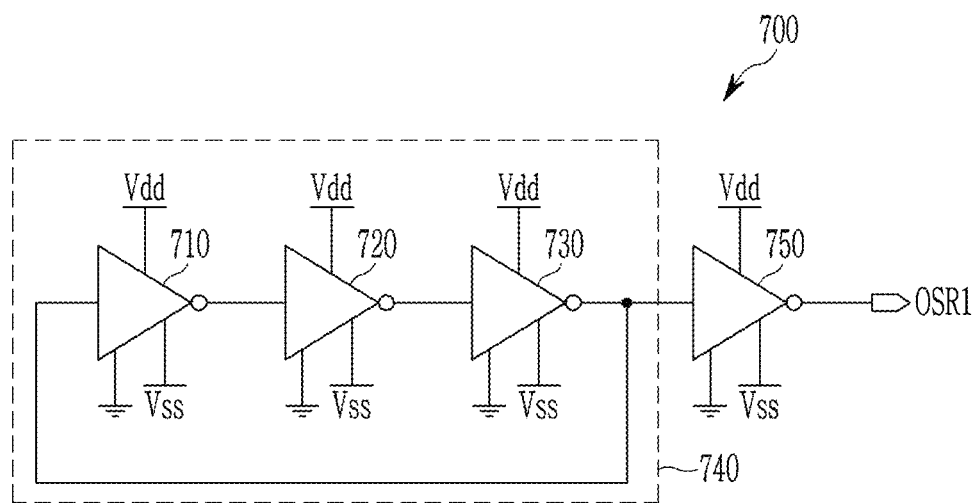
FIG. 10 shows a reference frequency oscillator according to an example embodiment.

FIG. 10 shows a reference frequency oscillator according to an example embodiment.

A reference frequency oscillator 700 includes a ring oscillator 740 formed of three inverters 710 to 730, and an output buffer 750.

An output of the inverter 710 is input to the inverter 720, an output of the inverter 720 is input to the inverter 730, and an output of the inverter 730 is input to the inverter 710. The output buffer 750 may be implemented as an inverter, and receives the output of the ring oscillator 740 to generate a reference oscillator signal OSR1.

An oscillator signal OS11 is input to a gate of a modulation transistor M1, and the modulation transistor M1 switches according to an oscillator signal OS11 to generate a first modulation signal. In this case, a variable resistor RS1 changes the strength of the first modulated signal according to the degree of sensing.

An oscillator signal OS12 is input to a gate of the modulation transistor M2, and the modulation transistor M2 switches according to an oscillator signal OS12 to generate a second modulated signal. In this case, a variable resistor RS2 changes the strength of the second modulated signal according to the degree of sensing.

The reference oscillator signal OSR1 is input to a gate of the reference transistor MR, and the reference transistor MR switches according to a reference oscillator signal OSR to generate a reference modulation signal. In this case, the reference modulated signal decreases according to the resistance value of the reference resistor RR.

The antenna 11 is driven according to the first modulated signal, the second modulated signal, and the reference modulated signal to generate a first sensor signal, a second sensor signal, and a reference frequency signal for each corresponding frequency band. The output signal of the tag device 10 in which the generated signals are combined is transmitted to the reader device 20.

Figure 11:
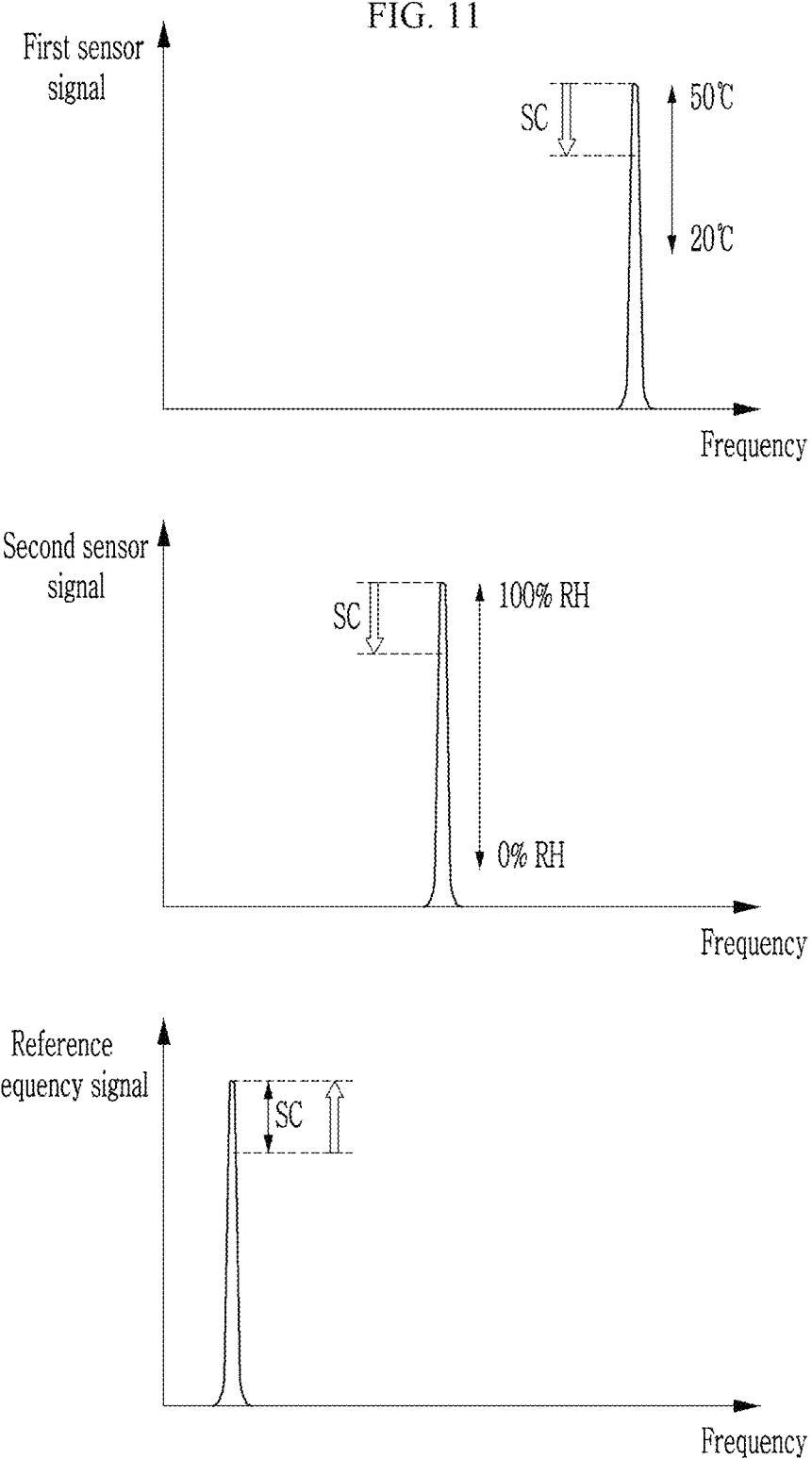
FIG. 11 is a waveform diagram that shows extraction of the output signal of the tag device, received by the reader device for each frequency bandwidth, and correction with respect to the extracted signals.

FIG. 11 is a waveform diagram that shows extraction of the output signal of the tag device, received by the reader device for each frequency bandwidth, and correction with respect to the extracted signals.

As shown in FIG. 11, a reference frequency signal RFT1 transmitted from the tag device 10 and a reference frequency signal FRF1 received at the reader device 20 have different frequencies due to coupling between the antennas 11 and 21. The memory 223 of the reader circuit 22 stores information on the frequency of the reference frequency signal RFT1 transmitted from the tag device 10, and detects a strength difference Sc between strength of the reference frequency signal RFR1 and strength of the reference frequency signal RFT1 extracted by the extracting unit 221.

The first sensor signal SE11 indicates a result detected in a temperature range of 20 degrees to 50 degrees by a temperature sensor (e.g., the sensor 161), and the second sensor signal SE12 indicates a result detected in a humidity range of 0% RH to 100% RH by a humidity sensor (e.g., the sensor 261).

The reader circuit 22 generates a first compensation sensor signal CSE11 corrected by the strength difference Sc from the extracted first sensor signal SE11, and generates a second compensation sensor signal CSE12 corrected by the strength difference Sc from the extracted second sensor signal SE12.

In FIG. 11, since the strength difference Sc of the reference frequency signal is increased, a first compensation sensor signal CSE11 and a second compensation sensor signal CSE11 are generated by reducing the strength of the first sensor signal SE11 and the strength of the second sensor signal SE12 by the strength difference Sc.

In the above embodiments, the tag device for generating the reference frequency signal and the reader device for correcting the DC voltage change due to the coupling by using one of the frequency and the strength of the reference frequency signal have been described.

Example embodiments are not limited thereto, and another method of estimating the degree of change of the DC voltage due to the coupling may be applied. Hereinafter, example embodiments in which a DC voltage change due to coupling is corrected without a reference frequency signal will be described.

Figure 12:
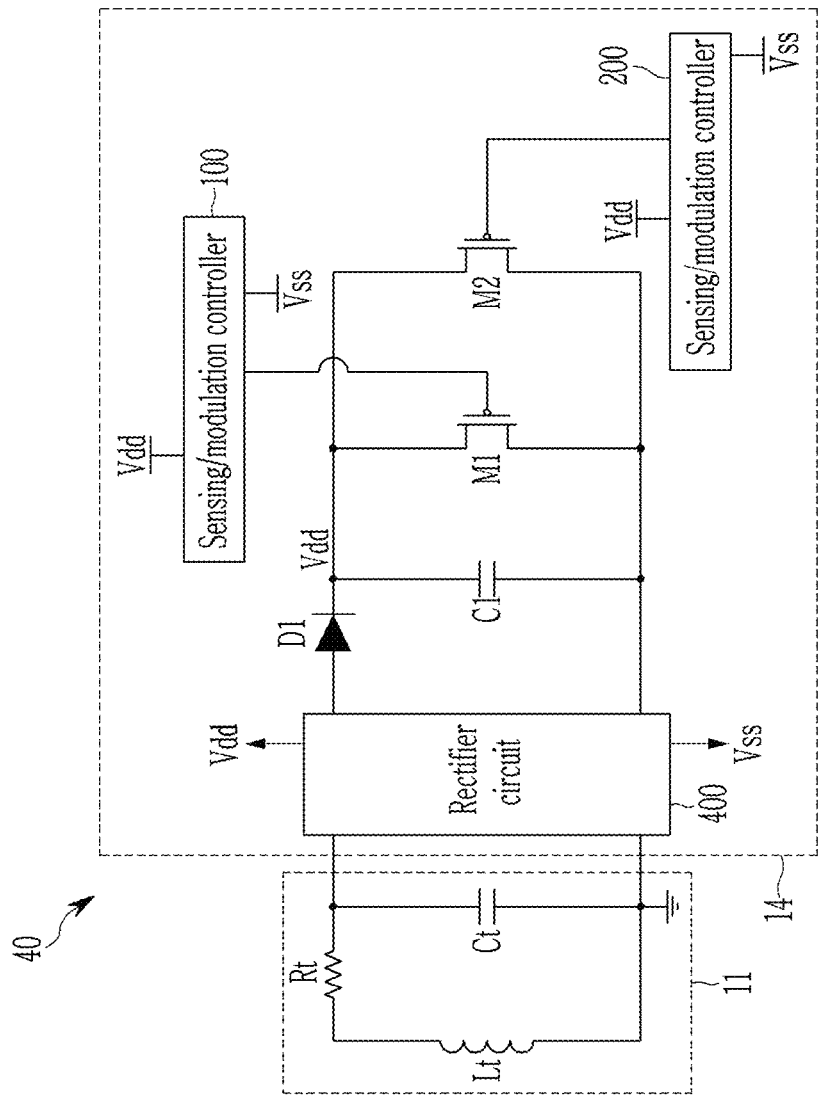
FIG. 12 shows a tag device according to an example embodiment.

FIG. 12 shows a tag device according to an example embodiment.

A tag driving circuit 14 of a tag device 40 shown in FIG. 12 does not include a reference transistor MR and a reference frequency oscillator 300, different from the tag device 10 according to the example embodiment shown in FIG. 2. Since other configurations are the same, the detailed description thereof is omitted.

The reader device 20 may correct the sensor signal by measuring a change in the DC component of the output signal of the tag device 40.

The extracting unit 221 of the reader circuit 22 may detect a DC component of the signal input through the antenna 21, and the correction unit 222 may correct the frequencies of the first sensor signal and the second sensor signal extracted for each frequency band based on the detected DC component.

The DC component of the output signal of the tag device 40 may increase as the coupling increases. Therefore, the reader circuit 22 can estimate the amount of change in frequency due to the coupling based on the DC component difference between the detected DC component and a reference DC component. The reader circuit 22 may measure the DC component as a DC voltage.

The correction unit 222 of the reader circuit 22 may estimate the frequency change amount according to the voltage difference between the detected DC voltage and the reference DC voltage, and correct the frequencies of each of the first sensor signal and the second sensor signal extracted for each frequency band by the frequency change amount.

When the frequency of the output signal of the tag device 40 is increased due to the increase in the coupling, the DC voltage detected by the reader circuit 22 may be a higher voltage than the reference DC voltage. The correction unit 222 of the reader circuit 22 may estimate the frequency change amount by using the voltage difference between the detected DC voltage and the reference DC voltage, and attenuate the frequencies of the first sensor signal and the second sensor signal by the frequency change amount.

Figure 13:
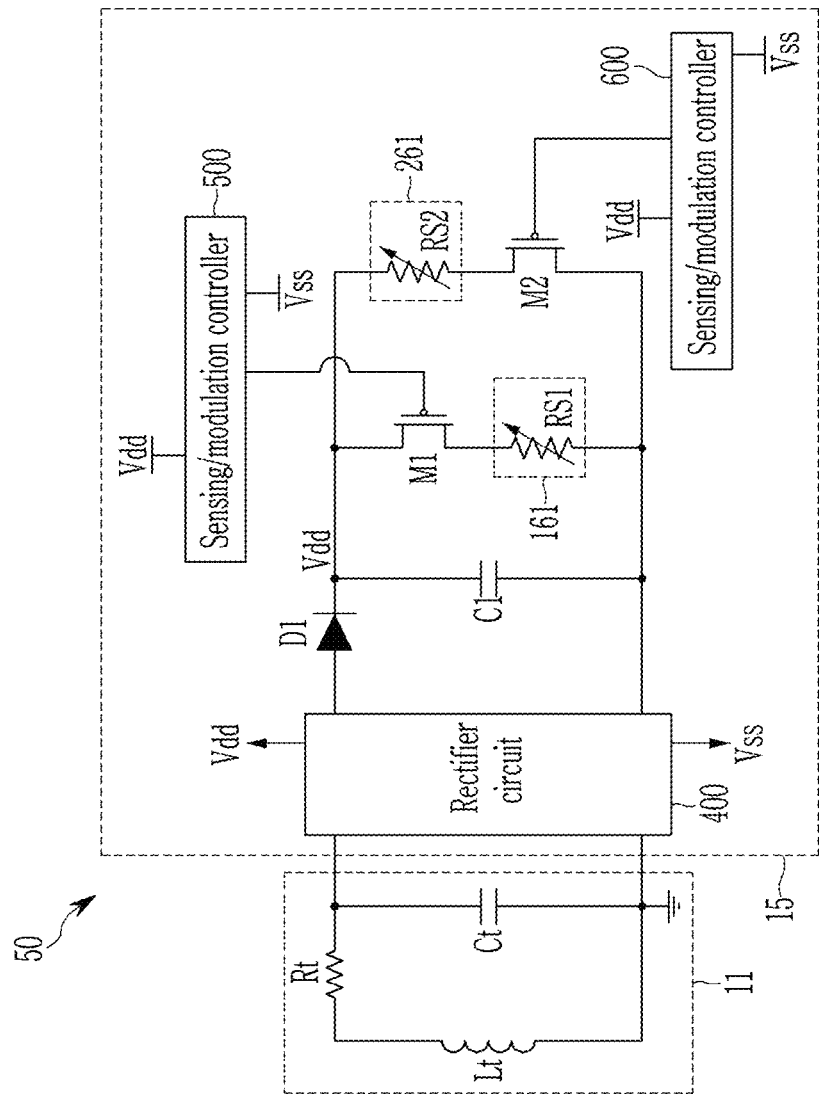
FIG. 13 shows a tag device according to an example embodiment.

FIG. 13 shows a tag device according to an example embodiment.

A tag driving circuit 15 of a tag device 50 shown in FIG. 13 does not include a reference transistor MR and a reference frequency oscillator 300, different from to the tag device 30 according to the example embodiment shown in FIG. 7. Since other configurations are the same, the detailed description is omitted.

The reader device 20 may correct a sensor signal by measuring a change in the DC component of an output signal of the tag device 50.

The extracting unit 221 of the reader circuit 22 may detect a DC component of a signal input through an antenna 21, and the correction unit 222 may correct strengths of a first sensor signal and a second sensor signal extracted for each frequency band based on the detected DC component.

The DC component of the output signal of the tag device 50 may increase as coupling increases. Therefore, the reader circuit 22 may estimate the amount of change in signal strength due to the coupling based on a DC component difference between the detected DC component and a reference DC component. The reader circuit 22 may measure the DC component as a DC voltage.

The correction unit 222 of the reader circuit 22 may estimate the amount of change in signal strength according to a voltage difference between the detected DC voltage and the reference DC voltage, and correct the strength of each of the first sensor signal and the second sensor signal extracted for each frequency band by the amount of change in the signal intensity.

When a frequency of an output signal of the tag device 50 is increased due to the increase in the coupling, the DC voltage detected by the reader circuit 22 may be a higher voltage than the reference DC voltage. The correction unit 222 of the reader circuit 22 may estimate the amount of change in the signal strength by using a voltage difference between the detected DC voltage and the reference DC voltage, and attenuate the strength of each of the first sensor signal and the second sensor signal by the amount of change in the signal intensity.

Figure 14:
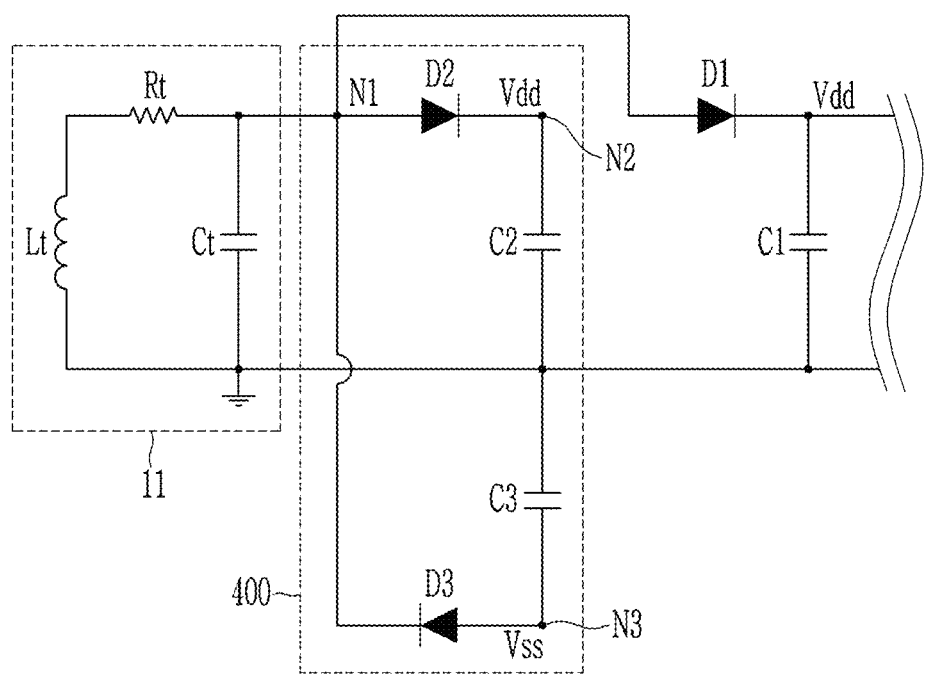
FIG. 14 shows a rectifier circuit according to an example embodiment.

FIG. 14 shows a rectifier circuit according to an example embodiment.

A rectifier circuit 400 may include two diodes D2 and D3 and two capacitors C2 and C3. The diode D2 rectifies a current flowing from one end of the antenna 11 to the ground, and the diode D3 rectifies a current flowing from the ground to one end of the antenna 11.

Specifically, an anode of the diode D2 is connected to a node N1, a cathode of the diode D2 is connected to a node N2, the capacitor C2 is connected between the node N2 and the ground, the capacitor C3 is connected between the ground and a node N3, an anode of the diode D3 is connected to the node N3, and a cathode of the diode D3 is connected to the node N1. An anode of a rectifying diode D1 of the capacitor C1 is connected to the node N1 and is connected between a cathode of the rectifying diode D1 and the ground.

When the AC input input through the antenna 11 is in a positive phase, a current flows to the ground through the diode D2 and the capacitor C2, and the rectifying diode D1 and the capacitor C1, and thus the capacitor C1 and the capacitor C2 are charged such that a driving voltage Vdd is generated.

When the AC input input through the antenna 11 is in a negative phase, a current flows from the ground to the capacitor C3 and the diode D3, and thus the capacitor C3 is charged such that a driving voltage Vss is generated in the node N3.

The rectifier circuit may be variously modified, and as another example, the rectifier circuit may be implemented as a bridge diode type.

Figure 15:
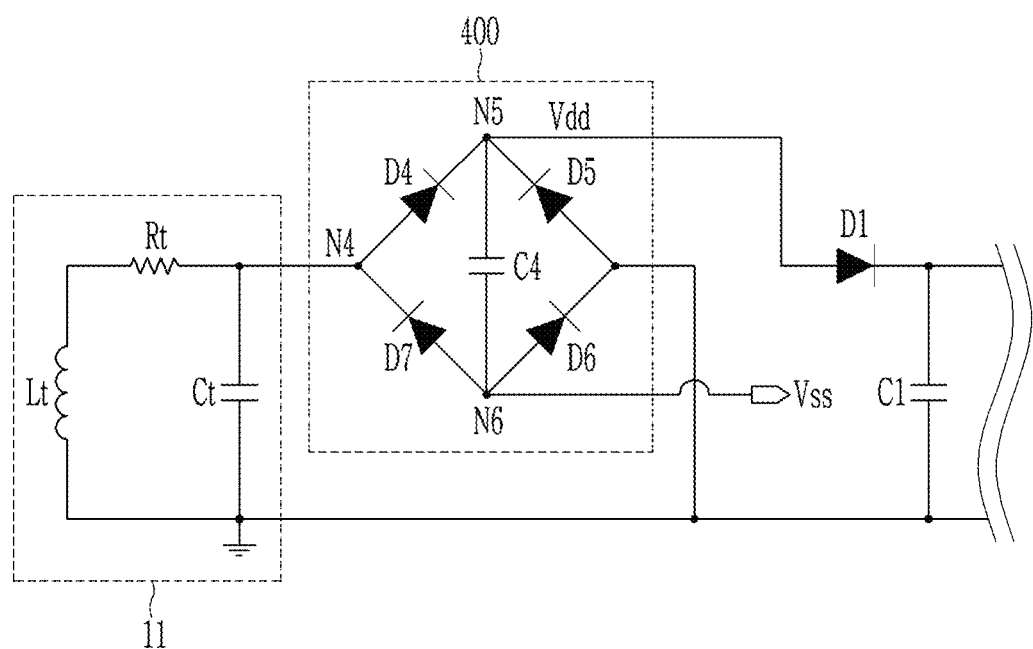
FIG. 15 shows the rectifier circuit according to the example embodiment.

FIG. 15 shows the rectifier circuit according to the example embodiment.

The rectifier circuit 400 may be implemented as a bridge diode type connected between one end of the antenna 11 and the ground. For example, the rectifier circuit 400 may include four diodes D4 to D7 and one capacitor C4. The diodes D4 and D6 rectify a current flowing from one end of the antenna 11 to the ground, and the diodes D5 and D7 rectify a current flowing from the ground to one end of the antenna 11.

An anode of diode D4 is connected to a node N4, a cathode of the diode D4 is connected to a node N5, a cathode of the diode D5 is connected to a node N5, a cathode of the diode D6 is connected to the ground, an anode of the diode D6 is connected to a node N6, an anode of the diode D7 is connected to the node N6, and a cathode of the diode D7 is connected to the node N4. The capacitor C4 is connected between a node N5 and a node N7.

When an AC input input through the antenna 11 is in a positive phase, a current flows to the ground through the diode D4, the capacitor C4, and the diode D6, and thus the capacitor C4 is charged.

When the AC input input through the antenna 11 is in a negative phase, a current flows from the ground through the diode D5, the capacitor C4, and the diode D7, and thus the capacitor C4 is charged.

Voltages of ends of the charged capacitor C4 are the driving voltage Vdd and the driving voltage Vss. That is, a voltage at the node N5 is the driving voltage Vdd, and a voltage at the node N6 is the driving voltage Vss.

Some of the elements of the tag device 10 and/or the reading device 20, described above, such as the reader circuit 22 may be implemented in processing circuitry such as hardware including logic circuits; a hardware/software combination such as a processor executing software; or a combination thereof and memory. For example, the processing circuitry more specifically may include, but is not limited to, a central processing unit (CPU), an arithmetic logic unit (ALU), a digital signal processor, a microcomputer, a field programmable gate array (FPGA), a programmable logic unit, a microprocessor, application-specific integrated circuit (ASIC), etc. The processing circuitry may be special purpose processing circuitry that corrects a change in the output signal of the flexible tag device based on a coupling change between the first antenna and the second antenna. Accordingly, the tag system may accurately measure a biological signal without being influenced by the coupling between the antenna of the tag device and the reader device. Additionally, the reader circuit 22 may further include a input/output device (I/O) and a bus to communicate between the memory, processing circuitry and I/O device.

Hereinabove, example embodiments using the reference frequency signal or the DC component for correcting coupling between antennas of the tag device and the reader device have been described. In addition, various modifications of the rectifier circuit have been described.

Through such various embodiments, the effect of the antenna coupling may be removed from the sensor signal indicating the sensing result to the sensor.

According to example embodiments, a flexible tag device for attaching a tag device to various body parts and simultaneously measuring a biological signal without being influenced by the coupling between the antenna of the tag device and the reader device, and a flexible tag system including the same, can be provided.

While example embodiments have been described in connection with what is presently considered to be practical example embodiments, it is to be understood that the example embodiments are not limited to the disclosed example embodiments. On the contrary, it is intended to cover various modifications and equivalent arrangements included within the spirit and scope of the appended claims.

DESCRIPTION OF SYMBOLS

1: flexible sensing system
10, 30, 40, 50: tag device
20: reader device
11, 21: antenna
12, 14, 15: tag driving circuit
22: reader circuit
100, 200: sensing/modulation controller
300: reference frequency oscillator
400: rectifier circuit
500, 600: modulation controller
110-130, 210-230, 310-330, 510-530, 610-630: inverter
140, 240, 540, 650: ring oscillator
150, 250, 550, 650: output buffer
160, 161, 260, 261: sensor

What is claimed is:

1. A flexible sensing system comprising:
    a flexible tag device including,
        a first antenna,
        a first sensor and a second sensor,
        a first modulation transistor and a second modulation transistor connected to ends of the first antenna,
        a first ring oscillator configured to drive the first modulation transistor together with the first sensor, and
        a second ring oscillator configured to drive the second modulation transistor together with the second sensor; and
    a reader device that is flexible, the reading device including a second antenna inductively coupled with the first antenna, the reader device configured to extract an output signal of the flexible tag device for each frequency bandwidth, and to correct a change in the output signal of the flexible tag device based on a coupling change between the first antenna and the second antenna.

2. The flexible sensing system of claim 1, wherein the flexible tag device further comprises:
    a reference frequency transistor connected between the ends of the first antenna; and
    a reference frequency oscillator configured to drive the reference frequency transistor, wherein
    the reader device includes processing circuitry configured to correct the change in the output signal of the first antenna based on a reference frequency signal according to load modulation of the reference frequency transistor.

3. The flexible sensing system of claim 2, wherein the reader device is configured to,
    extract the reference frequency signal for each frequency bandwidth from the output signal of the flexible tag device,
    extract a first sensor signal according to load modulation of the first modulation transistor,
    extract a second sensor signal according load modulation of the second modulation transistor, and
    correct a frequency of each of the first sensor signal and the second sensor signal based on a change in a frequency of the reference frequency signal.

4. The flexible sensing system of claim 3, wherein the processing circuitry of the reader device is configured to,
    detect a frequency difference between a transmitted version of the reference frequency signal transmitted from the flexible tag device and a received version of the reference frequency signal received at the reader device, and correct both the frequency of the first sensor signal and the frequency of the second sensor signal based on the frequency difference.

5. The flexible sensing system of claim 2, wherein the processing circuitry of the reader device is configured to, extract the reference frequency signal for each frequency bandwidth from the output signal of the flexible tag device, extract a first sensor signal according to load modulation of the first modulation transistor, extract a second sensor signal according to load modulation of the second modulation transistor, and correct strength of each of the first sensor signal and the second sensor signal based on a change in strength of the reference frequency signal.

6. The flexible sensing system of claim 5, wherein the processing circuitry of the reader device is configured to, detect a strength difference between a transmitted version of the reference frequency signal transmitted from the flexible tag device and a received version of the reference frequency signal received at the reader device, and correct the strength of the first sensor signal and the strength of the second sensor signal based on the strength difference.

7. The flexible sensing system of claim 1, wherein the processing circuitry of the reader device is configured to, measure a DC component change of the output signal of the flexible tag device, extract a first sensor signal and a second sensor signal for each frequency bandwidth from the output signal of the flexible tag device, and correct the first sensor signal and the second sensor signal based on the DC component change.

8. The flexible sensing system of claim 7, wherein the processing circuitry of the reader device comprises:

a reader circuit configured to, detect a DC component of a signal input through the second antenna, estimate an amount of change in frequency according to a DC component difference between the DC component and a reference DC component, and correct a frequency of each of the first sensor signal and the second sensor signal by the amount of change in the frequency.

9. The flexible sensing system of claim 7, wherein the processing circuitry of the reader device comprises:

a reader circuit configured to, detect a DC component of a signal input through the second antenna, estimate an amount of change in frequency according to a DC component difference between the DC component and a reference DC component, and correct strength of each of the first sensor signal and the second sensor signal based on the amount of change in the frequency.

10. The flexible sensing system of claim 1, wherein the first sensor is connected between feedback loops between an input and an output of the first ring oscillator, and the second sensor is connected between feedback loops between an input and an output of the second ring oscillator.

11. The flexible sensing system of claim 10, wherein the flexible tag device further comprises:

a reference frequency transistor connected between the ends of the first antenna; and a reference frequency oscillator configured to drive the reference frequency transistor, the reference frequency oscillator including a ring oscillator and a resistor having constant resistance, the resistor connected to a feedback loop between an input end and an output end of the ring oscillator.

12. The flexible sensing system of claim 1, wherein the first sensor is coupled in series with the first modulation transistor, and the second sensor is coupled in series with the second modulation transistor.

13. The flexible sensing system of claim 12, wherein the flexible tag device further comprises:

a reference frequency transistor;

a reference frequency oscillator configured to drive the reference frequency transistor; and a resistor having constant resistance, the resistor coupled in series with the reference frequency transistor between the ends of the first antenna.

14. The flexible sensing system of claim 1, further comprising:

a rectifier circuit configured to, rectify an AC input transmitted from the first antenna and to generate a first driving voltage and a second driving voltage, wherein the first driving voltage and the second driving voltage are supplied to the first ring oscillator and the second ring oscillator, respectively.

15. The flexible sensing system of claim 14, wherein the rectifier circuit comprises:

a first diode including an anode connected to the first antenna, the first diode configured to rectify a current flowing to a ground from one end of the first antenna;

a second diode including an anode connected to the ground, the second diode configured to rectify a current flowing to the one end of the first antenna from the ground;

a first capacitor connected between a cathode of the first diode and the ground, the first capacitor configured to receive the first driving voltage; and a second capacitor connected between the ground and the anode of the second diode, the second capacitor configured to receive the second driving voltage.

16. The flexible sensing system of claim 14, wherein the rectifier circuit comprises:

a first diode including an anode connected to one end of the first antenna and a cathode connected to a first node, the first node configured to receive the first driving voltage;

a second diode including an anode connected to a second node and a cathode connected to the one end of the first antenna, the second node configured to receive the second driving voltage;

a third diode including an anode connected to a ground and a cathode connected to the first node;

a fourth diode including an anode connected to the second node and a cathode connected to the ground; and a capacitor connected between the first node and the second node.

17. A flexible tag device that is inductively coupled with a reader device, comprising:

a first antenna;

a first sensor and a second sensor;

a first modulation transistor and a second modulation transistor connected between ends of the first antenna;

a reference frequency transistor connected between the ends of the first antenna;

a first ring oscillator configured to drive the first modulation transistor together with the first sensor;

a second ring oscillator configured to drive the second modulation transistor together with the second sensor; and a reference frequency oscillator configured to drive the reference frequency transistor, wherein a change in an output signal of the flexible tag device, due to a coupling change between the first antenna and a second antenna of the reader device, is corrected based on a reference frequency signal generated by driving of the reference frequency transistor.

18. The flexible tag device of claim 17, wherein the first sensor is connected between a feedback loop between an input end and an output end of the first ring oscillator, the second sensor is connected between a feedback loop between an input end and an output end of the second ring oscillator, a first sensor signal and a second sensor signal are extracted for each frequency bandwidth from the output signal of the flexible tag device, and a frequency of the first sensor signal and the second sensor signal are corrected based on a change in frequency of the reference frequency signal.

19. The flexible tag device of claim 17, wherein the first sensor is coupled in series with the first modulation transistor and the second sensor is coupled in series with the second modulation transistor, a first sensor signal and a second sensor signal are extracted for each frequency bandwidth from the output signal of the flexible tag device, and strengths of the first sensor signal and the second sensor signal are corrected based on a change in strength of the reference frequency signal.

20. The flexible tag device of claim 17, wherein the first antenna, the first and second modulation transistor, the first ring oscillator, the second ring oscillator, the first sensor, the second sensor, the reference frequency transistor, and the reference frequency oscillator are flexible.

\* \* \* \* \*